UNITED STATES PATENT OFFICE.

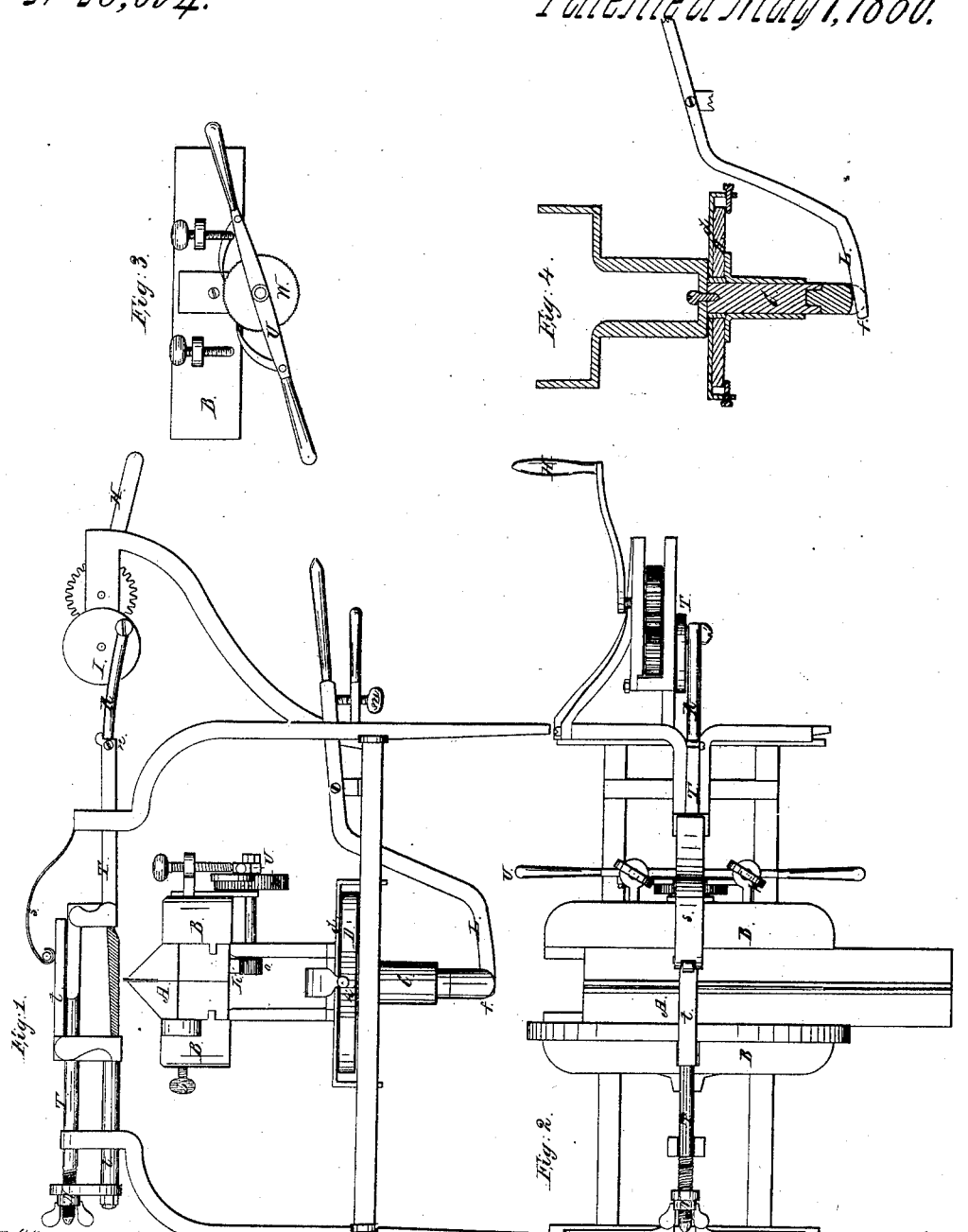

PATRICK McMAHON, OF SCOTTSVILLE, NEW YORK.

MACHINE FOR FILING SAWS.

Specification of Letters Patent No. 28,094, dated May 1, 1860.

*To all whom it may concern:*

Be it known that I, PATRICK McMAHON, of Scottsville, in the county of Monroe and State of New York, have made and invented certain new and useful Improvements in Machines for Filing Saws, of which the following is a full and accurate description, reference being had to the accompanying drawings, making part of this specification, and to the letters of reference marked thereon, same letters referring to like parts in all the figures.

Of said drawings Figure 1 is a side elevation of my machine. Fig. 2 is a plan of the same. Fig. 3 is a side view of the device for moving the saw forward and Fig. 5 is a detail section.

This invention consists in a certain arrangement and combination of devices whereby the teeth of any saw with a straight edge may be speedily and accurately filed of equal size and in a perfectly straight line and this without superior skill on the part of the operator.

In order to give a clear and detailed description of its construction and operation I will proceed to describe its various parts in the order in which they come into use in filing a saw.

The first operation being to clamp the saw firmly in the machine I provide two wooden clamps A A, between which the saw is placed and firmly held by means of screws which pass through them. These blocks fit accurately into the groove or space between the blocks B B and are kept from any lateral movement by means of the screw b. The blocks B B are attached to the arms of the fork which is supported by the shaft C and thus abundant space is afforded for the handle of the saw to pass the center of the machine as is necessary in filing hand saws.

The saw being firmly fixed in the machine it is set to the proper angle in relation to the line of motion of the file by the following means: The clamp containing the saw is supported by the shaft or bolt C which is round at its lower extremity where it passes through the index block D but is square at its upper extremity where it passes through the disk d to which the handle h is attached. The disk d is free to revolve on the top of the index plate D and may be moved by means of the handle h. It of course carries around the shaft C and with it the clamp containing the saw which may thus be set to any angle the handle h being provided with a catch which falls into the notches in the index plate and retains the disk and its attachments in any required position.

The saw being in proper position is gradually raised to the file by means of the lever L which turns on the pivot e and works in a slot cut in the block P which is so attached to the lower end of the shaft C that the latter (the shaft C) may be free to revolve without affecting the position of the lever L in the aforesaid slot.

The depth to which the teeth are cut depends of course upon the extent to which the handle of the lever L is depressed, and this is regulated by means of the screw m which may be set so as to stop it at any desired point.

The machine being thus far properly adjusted motion is communicated to the file by means of the handle H which imparts a multiplied motion to the faceplate I by means of gearing. This faceplate carries a stud or crankpin to which the connecting-rod R is attached, and this connecting-rod is linked to the bar T in a manner to be hereafter described. The file is secured to the bar T as follows: Forming part of T is the bar T' upon which is cut a screwed thread to receive the thumb-nut N. By turning this nut the bar t is drawn toward T and the file is securely fixed between them, its ends passing into holes provided for the purpose. Instead of simple holes it might be well to provide sockets to hold the file which sockets might be securely fixed by set screws. But in either case it is easy to set the file so that the tooth of the saw shall form any required angle with the blade.

In moving the file back and forth it is of course necessary that it be lifted up on its return movement so as not to injure it. To effect this it will be seen that the connecting rod R is attached to the bar T by means of a stop joint so that the connecting rod and bar cannot bend past a straight line; and thus when the crank-pin rises (as it does in revolving) it carries up the bar T and consequently the file with it. To allow of this movement the slot in the frame through which the bar T passes is elongated vertically and as the weight of the file would not be sufficient to cut the saw with sufficient rapidity I arrange the spring S as seen in Fig. 1 which might if necessary be regulated by a set screw.

The only remaining point which demands attention is the means provided for advancing the saw by one tooth in equal quantities so that all the teeth may be of the same size. This is effected by the means shown in Figs. 1 and 3. Attached to the under side of the clamp A is the rack *k* which is moved forward by means of the pinion *o* attached to the same shaft that carries the ratchet wheel *w*. This ratchet wheel is turned by means of the dogs attached to the double-handed lever *v* and it will be evident that the clamp carrying the saw will be moved forward just in proportion as the range of motion of the lever is greater or less. To regulate this two thumb-screws pass through ears attached to the block B and may be so regulated as to allow of any range of motion on the part of the lever and consequently of any size of tooth in the saw.

Having thus described my invention what I claim therein as new and desire to secure by Letters Patent is—

1. I claim the combination of the spring S with the stop-joint *n* in connection with the other parts of the file-carrier—the whole operating in the manner and for the purpose substantially as set forth.

2. I claim the combination of the index plate D and disk *d* with the shaft *c* said shaft being composed of two sections one cylindric and the other square the square section passing through the disk *d* and being carried around by it; the cylindric section passing through the index plate D and moving freely in it—the whole operating in the manner and for the purpose set forth.

PATRICK McMAHON.

Witnesses:
JOHN PLIM,
JOHN ROCHE.